United States Patent
Haruta et al.

(10) Patent No.: US 9,296,867 B2
(45) Date of Patent: Mar. 29, 2016

(54) HEAT-SHRINKABLE POLYESTER-BASED FILM

(71) Applicant: TOYOBO CO., LTD., Osaka-shi, Osaka (JP)

(72) Inventors: Masayuki Haruta, Tsuruga (JP); Yukinobu Mukoyama, Tsuruga (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/416,431

(22) PCT Filed: Jul. 19, 2013

(86) PCT No.: PCT/JP2013/069605
§ 371 (c)(1),
(2) Date: Jan. 22, 2015

(87) PCT Pub. No.: WO2014/021120
PCT Pub. Date: Feb. 6, 2014

(65) Prior Publication Data
US 2015/0175756 A1    Jun. 25, 2015

(30) Foreign Application Priority Data
Aug. 3, 2012 (JP) ................. 2012-172816

(51) Int. Cl.
C08J 5/18 (2006.01)
B29C 55/12 (2006.01)
C08L 67/02 (2006.01)
B29C 61/00 (2006.01)
B29K 67/00 (2006.01)

(52) U.S. Cl.
CPC .................. C08J 5/18 (2013.01); B29C 61/003 (2013.01); B29K 2067/00 (2013.01); C08J 2367/02 (2013.01); C08J 2467/02 (2013.01)

(58) Field of Classification Search
None
See application file for complete search history.

(56) References Cited

U.S. PATENT DOCUMENTS

2009/0270584 A1* 10/2009 Endo ............... B29C 55/146
                                                                  528/308.1
2010/0256309 A1* 10/2010 Endo ............... B29C 55/14
                                                                  525/384

FOREIGN PATENT DOCUMENTS

| JP | S63-027535 A | 2/1988 |
| JP | H01-127317 A | 5/1989 |
| JP | H08-244114 A | 9/1996 |
| JP | 2008-179122 A | 8/2008 |
| WO | WO 2009/075333 A1 | 6/2009 |

OTHER PUBLICATIONS

Haruta et al., "Study on stretching methods of biaxially stretched co-polyester film which has uniaxially heat shrinkage properties," *Journal of the Japan Society of Polymer Processing*, 22(3): 160-167 (Jul. 24, 2010).
Japanese Patent Office, International Search Report in International Patent Application No. PCT/JP2013/069605 (Sep. 3, 2013).

* cited by examiner

*Primary Examiner* — Randy Gulakowski
*Assistant Examiner* — Christopher M Rodd
(74) *Attorney, Agent, or Firm* — Leydig, Voit & Mayer, Ltd.

(57) ABSTRACT

The invention provides a heat-shrinkable polyester-based film containing ethylene terephthalate as a main constituent component and 0-5 mol % of a monomer component that can be an amorphous component based on all of the polyester resin components. The inventive film has a main shrinkage direction in the longitudinal direction, with heat shrinkage properties in the longitudinal direction and the width direction and a refractive index within specified ranges.

4 Claims, 1 Drawing Sheet

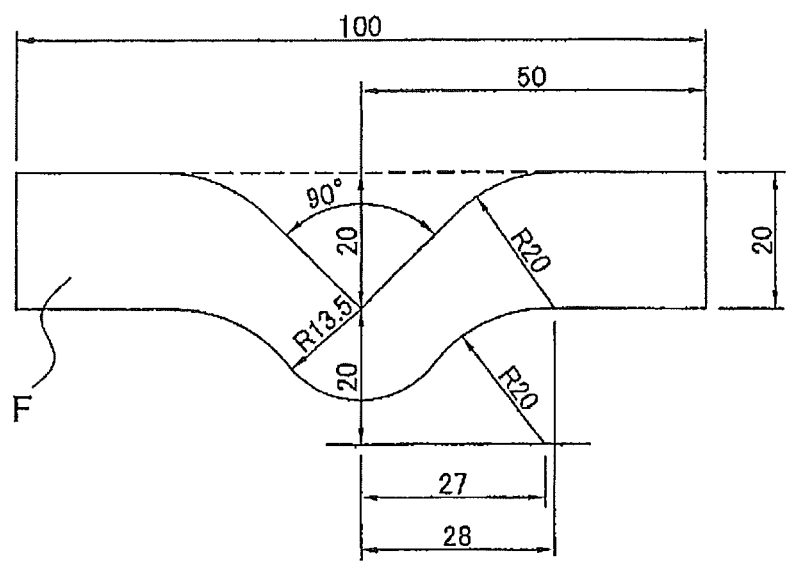

HEAT-SHRINKABLE POLYESTER-BASED FILM

CROSS-REFERENCE TO RELATED APPLICATIONS

This patent application is the U.S. national phase of International Patent Application No. PCT/JP2013/069605, filed Jul. 19, 2013, which claims the benefit of Japanese Patent Application No. 2012-172816, filed on Aug. 3, 2012, which are incorporated by reference in their entireties herein.

TECHNICAL FIELD

The present invention relates to a heat-shrinkable polyester-based film and a packaged body, and specifically relates to a heat-shrinkable polyester-based film which is suitable for a label application and does not contain an amorphous component as a monomer component constituting a polyester in a large amount.

BACKGROUND ART

Recently, in applications such as label package serving both as a protection of a glass bottle and a PET bottle etc. and display of articles, cap sealing and accumulation package, there have been widely used stretched films (so-called heat-shrinkable films) composed of a polyvinyl chloride-based resin, a polystyrene-based resin, a polyester-based resin or the like. Of these heat-shrinkable films, a polyvinyl chloride-based film has problems that heat resistance is low, and it generates hydrogen chloride gas in incineration and causes dioxin. A polystyrene-based film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in distribution amount of PET containers.

Therefore, as a shrink label, there has been widely used a polyester-based film which is high in heat resistance, easy to incinerate, and excellent in chemical resistance, and the use amount tends to increase being accompanied by an increase in distribution amount of PET containers.

As a general heat-shrinkable polyester-based film, a film is widely utilized which greatly shrinks in the width direction. A heat-shrinkable polyester-based film in which the width direction is the main shrinkage direction as described above is stretched at a high ratio in the width direction in order to exhibit shrinkage properties in the width direction, but is often stretched at a low ratio in the longitudinal direction orthogonal to the main shrinkage direction or may not be stretched. Films stretched only at a low ratio in the longitudinal direction and films stretched only in the width direction as described above have a disadvantage that the mechanical strength in the longitudinal direction is low.

Further, a label for a bottle needs to be heat-shrunk in the circumferential direction after being attached in a ring shape on a bottle, and therefore, when a heat-shrinkable film which heat-shrinks in the width direction is attached on a bottle as a label, a ring-shaped body is formed such that the width direction of the film is set in the circumferential direction, and then the ring-shaped body needs to be cut at every prescribed length so as to be attached on a bottle. Consequently, it is difficult to attach a label made of the heat-shrinkable film which heat-shrinks in the width direction on a bottle at a high speed. Therefore, recently, a longitudinally heat-shrinkable film has been demanded which can be attached on a bottle by winding directly on the circumference of the bottle from a film roll (so-called wrap round). Further, recently, a wrapping method has been developed which keeps a one-way opening container, such as a lunch box, made of a synthetic resin in a closed state by covering the circumference of the container with a belt-like film, and a longitudinally shrinkable film is also suitable for such a wrapping application. Consequently, it is expected that a demand for a longitudinally shrinkable film will be increased in future.

Furthermore, a film made of recycled raw materials derived from PET bottles is highly demanded in terms of environmental awareness. However, since a common heat-shrinkable polyester film is obtained by using raw materials containing amorphous components in a large amount in order to provide heat shrinkage properties, the ratio of mixing recycled raw materials is limited and it has not been possible to provide a heat-shrinkable polyester-based film containing recycled raw materials in a large amount.

For example, Patent Document 1 discloses an ideal heat-shrinkable polyester film which has the main shrinkage direction in the vertical direction and has high mechanical strength in the vertical and transverse directions. However, this film contains 10 mol % or more of one or more kinds of monomer components that can be amorphous components in the whole polyester resin components, and the addition ratio of recycled raw materials is naturally limited in the upper limit.

Further, Patent Document 2 discloses, in Example 1, a heat-shrinkable film obtained by stretching an unstretched crystalline PET film at two times in the vertical direction and at 0.95 times in the transverse direction with a tube extruder. This heat-shrinkable film is a film having the main shrinkage direction in the vertical direction but is not stretched in the transverse direction and thus has low mechanical strength in the transverse direction. As described in Comparative Example 2 in Patent Document 2, the shrinkage rate in the transverse direction increases if stretching at 1.3 times is carried out in the transverse direction, and therefore, the film is not desirable as a heat-shrinkable film which is used for a label for a bottle and has the main shrinkage direction in the vertical direction. That is, according to the invention disclosed in Patent Document 2, it is difficult to obtain a heat-shrinkable film having the main shrinkage direction in the vertical direction and showing low heat shrinkage rate in the transverse direction and having high mechanical strength in the transverse direction.

Patent Document 1: JP-A-2008-179122 (claim 1 or the like)

Patent Document 2: JP-A-hei-1-127317 (Example 1 or the like)

SUMMARY OF THE INVENTION

Problems to be Solved by the Invention

The present invention aims to solve the problems of the heat-shrinkable polyester films disclosed in Patent Documents 1 and 2, and to provide a heat-shrinkable polyester-based film which has sufficient heat shrinkage properties in the main shrinkage direction, which is the longitudinal direction, even without containing monomer components that can be amorphous components in a large amount; which has low heat shrinkage rate and high mechanical strength in the width direction orthogonal to the main shrinkage direction; which can be produced even in the case of containing recycled raw materials of PET bottles in a large amount; and which has small thickness unevenness in the longitudinal direction, which is the main shrinkage direction.

Solutions to the Problems

That is, the present invention is configured as follows.
1. A heat-shrinkable polyester-based film comprising ethylene terephthalate as a main constituent component and containing 0 mol % or more and 5 mol % or less of a monomer component that can be an amorphous component in the whole polyester resin components, and having a main shrinkage direction in the longitudinal direction, wherein the heat-shrinkable polyester-based film satisfies the following requirements (1) to (3):

(1) a hot water heat shrinkage rate in the longitudinal direction is 15% or more and 50% or less when the film is treated in hot water at 90° C. for 10 seconds;

(2) a hot water heat shrinkage rate in the width direction orthogonal to the longitudinal direction is 0% or more and 12% or less when the film is treated in hot water at 90° C. for 10 seconds; and (3) a refractive index in the longitudinal direction is 1.570 or more, a refractive index in the width direction is 1.570 or more, and the refractive index in the width direction, which is the direction orthogonal to the main shrinkage direction, is higher than the refractive index in the longitudinal direction, which is the main shrinkage direction.

2. The above-mentioned first heat-shrinkable polyester-based film, wherein a tensile breaking strength in the width direction, which is the direction orthogonal to the main shrinkage direction, is 80 MPa or more and 200 MPa or less.

3. The above-mentioned first or second heat-shrinkable polyester-based film, wherein the film has a thickness unevenness of 11% or less in the longitudinal direction, which is the main shrinkage direction.

Effects of the Invention

The present invention makes it possible to provide a heat-shrinkable polyester-based film which has sufficient heat shrinkage properties in the main shrinkage direction, which is the longitudinal direction, even without containing monomer components that can be amorphous components in a large amount; which has low heat shrinkage rate and high mechanical strength in the width direction orthogonal to the main shrinkage direction; and which has small thickness unevenness in the longitudinal direction, which is the main shrinkage direction. The present invention makes it possible to provide a heat-shrinkable polyester-based film highly ecological and containing recycled polyester of PET bottles in a large amount since there is no need to add a large amount of monomer components that can be amorphous components to the raw materials. The heat-shrinkable polyester-based film of the present invention can be used preferably as a label for a container such as a bottle, can be attached on a container such as a bottle highly efficiently within a short time, and gives good finishing with extremely few wrinkles and blisters due to heat shrinkage or shrinkage shortage when the film is heat-shrunk after the attachment.

BRIEF DESCRIPTION OF THE DRAWING

FIG. 1 is an explanatory drawing showing a shape of specimen in measurement of right-angle tearing strength (unit in length of each part of specimen in the FIGURE is mm; and R represents a radius).

MODE FOR CARRYING OUT THE INVENTION

A preferable production method for continuously producing any of the above-mentioned first to third heat-shrinkable polyester-based films is a method comprising stretching an unstretched polyester-based film, the film containing ethylene terephthalate as a main constituent component and containing 0 mol % or more and 5 mol % or less of a monomer component that can be an amorphous component in the whole polyester resin components, at 3.5 times or more and 6.0 times or less in the width direction at a temperature of Tg+5° C. or higher and Tg+40° C. or lower in the state of holding both ends of the film in the width direction with clips in a tenter; thereafter stretching the film at 1.5 times or more and 2.5 times or less in the longitudinal direction at a temperature of Tg+5° C. or higher and Tg+40° C. or lower with use of heated rolls at different speeds; and subsequently, relaxing the film by 0% or more and 15% or less in the width direction while subjecting the film to heat treatment at Tg or higher and Tg+30° C. or lower in the state of holding both ends of the film with clips.

The film of the present invention contains ethylene terephthalate as a main constituent component. Herein, the main constituent component means that ethylene terephthalate unit is in an amount of 95% or more in the whole constituent components of a polymer constituting the film. Use of ethylene terephthalate as a main constituent component can provide excellent mechanical strength and transparency.

Ethylene terephthalate may be the whole constituent components of a polymer constituting the film, and a polymerization method to be employed for obtaining such polyethylene terephthalate (hereinafter, may be referred to as simply PET) may be any production method such as a direct polymerization method for causing direct reaction of terephthalic acid, ethylene glycol and, if necessary, other dicarboxylic acid components and diol components; a transesterification method for causing transesterification of terephthalic acid dimethyl ester (including other dicarboxylic acid methyl esters if necessary) and ethylene glycol (including other diol components if necessary); etc.

The intrinsic viscosity of polyethylene terephthalate is preferably in a range of 0.45 to 0.70. If the intrinsic viscosity is less than 0.45, the tear resistance improvement effect is decreased, and if it is more than 0.70, the filtration pressure increases and highly precise filtration is difficult to be carried out, and therefore it is not so preferable.

In the present invention, recycled raw materials of PET bottles can be used among PET (hereinafter, may be simply referred to as recycled raw materials). Recycled raw materials basically contain PET as a constituent component for good moldability at the time of producing PET bottles, but generally contain isophthalic acid as a monomer component in a small amount. In the present invention, polymer raw materials containing a monomer component that can be an amorphous component are not used in a large amount, but isophthalic acid may be contained in the recycled raw materials, so that it is expressed such that an amorphous monomer is contained in a range of 0 mol % or more and 5 mol % or less.

A representative example of the monomer that can be an amorphous component is isophthalic acid, and examples of the monomer may also include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol, and these monomers may be contained within the above-mentioned range without any particular problem.

When the heat-shrinkable polyester-based film of the present invention is treated for 10 seconds under no-load condition in hot water at 90° C., heat shrinkage rate in the longitudinal direction of the film calculated from the following Equation 1 (namely, hot water heat shrinkage rate at 90° C.) is preferably 15% or more and 50% or less from the lengths before and after shrinkage.

$$\text{Heat shrinkage rate} = \{(\text{length before shrinkage} - \text{length after shrinkage})/\text{length before shrinkage}\} \times 100(\%) \quad \text{Equation 1}$$

If the hot water heat shrinkage rate at 90° C. in the longitudinal direction is less than 15%, because of low shrinkage degree, wrinkles and sagging occur in a label after heat shrinkage in the case where the film is used for a label, and therefore it is not preferable. On the other hand, there is no particular problem even if the hot water heat shrinkage rate at 90° C. in the longitudinal direction exceeds 50%, but in the present invention, heat shrinkage rate is normally about 50% as the upper limit. Additionally, the lower limit of the hot water heat shrinkage rate at 90° C. in the longitudinal direction is preferably 20%, more preferably 25%, and particularly preferably 30%.

In the case where a cylindrical-shaped label of the film of the present invention having the main shrinkage direction in the circumferential direction is previously formed by bonding and thereafter fitted on a bottle (attached on the circumference of a bottle or the like by heat shrinkage), the hot water heat shrinkage rate at 90° C. in the longitudinal direction is preferably 40% or more. In the case where a cylindrical-shaped label having the main shrinkage direction in the circumferential direction is previously formed and thereafter fitted on a bottle as described above, if the hot water heat shrinkage rate at 90° C. in the longitudinal direction is less than 40%, because of low shrinkage degree, wrinkles and sagging occur in the label after heat shrinkage, and it is not so preferable. In the case where a cylindrical-shaped label having the main shrinkage direction in the circumferential direction is formed by bonding and thereafter fitted on a bottle, the lower limit of the hot water heat shrinkage rate at 90° C. in the longitudinal direction is preferably 42% or more, more preferably 44% or more, and particularly preferably 46% or more. The upper limit is of course 50%.

In the case where the film of the present invention is attached directly on the circumference of a bottle by winding the film from a film roll in a wrap round manner, the hot water heat shrinkage rate at 90° C. in the longitudinal direction is preferably 15% or more and less than 40%. If the hot water heat shrinkage rate at 90° C. in the longitudinal direction is less than 15%, because of low shrinkage degree, wrinkles and sagging occur at the time of heat shrinkage after the film as a label is wound in a wrap round manner, and therefore it is not preferable. Hereinafter, the application as described above may be referred to as a wrap round application.

When the heat-shrinkable polyester-based film of the present invention is treated for 10 seconds under no-load condition in hot water at 90° C., hot water heat shrinkage rate in the width direction of the film calculated from the above Equation 1 is preferably 0% or more and 12% or less from the lengths before and after shrinkage.

If the hot water heat shrinkage rate at 90° C. in the width direction exceeds 12%, strains at the time of heat shrinkage tend to occur in the case where the film is used as a label, and therefore it is not preferable. The upper limit of the hot water heat shrinkage rate at 90° C. in the width direction is preferably 11% or less, more preferably 10% or less, furthermore preferably 9% or less, particularly preferably 8% or less, and most preferably 7% or less. In consideration of the essential properties of the polyester resin serving as a raw material, the lower limit of the hot water heat shrinkage rate at 90° C. in the width direction is considered to be about 0%.

The heat-shrinkable polyester-based film of the present invention preferably has a refractive index of 1.57 or more in the longitudinal direction, which is the main shrinkage direction. The refractive index in the longitudinal direction, which is the main shrinkage direction, is preferably 1.61 or less. The refractive index in the width direction orthogonal to the main shrinkage direction is preferably 1.57 or more, furthermore preferably 1.62 or more and 1.65 or less, and the refractive index in the width direction is preferably higher than the refractive index in the longitudinal direction.

Conventionally, a heat-shrinkable film obtained by using amorphous raw materials generally has a higher shrinkage rate if having higher orientation of molecular chains in the main shrinkage direction. Accordingly, in the case of using amorphous raw materials, the shrinkage rate has been lowered by controlling the stretch ratio in the main shrinkage direction to be high and then making the shrinkage rate high, and by carrying out no stretching in the direction orthogonal to the main shrinkage direction or by heat treatment even if stretching in the direction orthogonal to the main shrinkage direction is carried out. However, the heat-shrinkable film of the present invention produced using crystalline PET is found to show behavior that is different from the behavior of the heat-shrinkable film obtained by using amorphous PET such that the shrinkage rate is high by stretching an unstretched film at a relatively low stretch ratio of about 2.5 times or less and aligning molecular chains (low molecular orientation), but the heat shrinkage rate is lowered by stretching an unstretched film at a higher stretch ratio and making the orientation of molecular chains higher. That is, it is found that, in the case of crystalline PET, molecular orientation crystallization is promoted by first stretching an unstretched film in the width direction at a high stretch ratio, and the shrinkage rate can be lowered in the width direction without heat treatment.

The thickness unevenness is very worsened if an unstretched film obtained by using conventional crystalline PET raw materials is stretched at a low ratio (about two times) so as to give low molecular orientation, and therefore, an unstretched film obtained by using PET raw materials has hardly been stretched at a ratio of around two times. However, it is found that if a film, which is once stretched at a high stretch ratio in the width direction, is stretched at around two times in the longitudinal direction, the thickness unevenness in the longitudinal direction is improved. This is considered to be because the stretch stress and the stress-strain curve are changed at the time of stretching an unstretched film at around two times in the longitudinal direction by once stretching the unstretched film at a high stretch ratio in the width direction, different from the case of uniaxially stretching an unstretched film at a low stretch ratio.

Accordingly, in the present invention, different from the case of a conventional heat-shrinkable film obtained by using amorphous raw materials, it is desirable that the orientation of molecular chains in the main shrinkage direction is low and the orientation of molecular chains in the width direction orthogonal to the main shrinkage direction is high.

The refractive index in the longitudinal direction, which is the main shrinkage direction, is preferably 1.57 or more. The upper limit thereof is desirably 1.61. If the refractive index is less than 1.57, the shrinkage rate in the longitudinal direction tends to be insufficient and the mechanical strength in the longitudinal direction tends to be low, and therefore it is not so preferable. If the refractive index in the longitudinal direction is more than 1.61, the mechanical strength in the longitudinal direction is high, but the heat shrinkage rate tends to be low, and therefore it is not so preferable. The refractive index in the longitudinal direction is preferably 1.575 or more and 1.605 or less, and furthermore preferably 1.58 or more and 1.60 or less.

The refractive index in the width direction orthogonal to the main shrinkage direction is preferably 1.57 or more, and more preferably 1.62 or more. On the other hand, the upper limit thereof is desirably 1.65. If the refractive index is less than 1.57, the shrinkage rate tends to be high and the mechanical strength in the width direction tends to be low, and therefore it is not so preferable. If the refractive index in the width direction is more than 1.65, the mechanical strength in the width direction is high and the heat shrinkage rate is low, and therefore it is preferable, but the stretch ratio at which the refractive index becomes more than 1.65 is not acceptable in terms of operability, so that the upper limit should be 1.65.

The heat-shrinkable polyester-based film of the present invention preferably has a thickness unevenness of 11% or less in the longitudinal direction. If the thickness unevenness in the longitudinal direction exceeds 11%, printing unevenness tends to occur at the time of printing in label production or shrinkage unevenness tends to occur after heat shrinkage, and therefore it is not so preferable. The thickness unevenness in the longitudinal direction is preferably 10% or less, more preferably 8% or less, and even more preferably 6% or less. It is better as the thickness unevenness in the longitudinal direction is close to 0%, but the lower limit thereof should be 2% in practical use.

The thickness of the heat-shrinkable polyester-based film of the present invention is not particularly limited, but as a heat-shrinkable film for a label, the thickness is preferably 5 to 100 μm and more preferably 10 to 95 μm.

The heat-shrinkable polyester-based film of the present invention preferably has a tensile breaking strength of 80 MPa or more and 200 MPa or less in the width direction. A method for measuring the tensile breaking strength will be described in Examples. If the tensile breaking strength is below 80 MPa, "stiffness" is low at the time of attaching the film as a label on a bottle or the like, and therefore it is not preferable. On the contrary, if the tensile breaking strength exceeds 200 MPa, the cutting property (easiness of tearing) in an initial stage at the time of tearing a label is inferior, and therefore it is not preferable. The tensile breaking strength is more preferably 100 MPa or more, furthermore preferably 110 MPa or more, and particularly preferably 120 MPa or more, and more preferably 190 MPa or less, furthermore preferably 180 MPa or less, and particularly preferably 170 MPa or less.

In the heat-shrinkable polyester-based film of the present invention, when right-angle tearing strength per unit thickness in the width direction is determined by the following method after being shrunk by 10% in hot water at 90° C., the right-angle tearing strength in the width direction is preferably 100 N/mm or more and 300 N/mm or less.

[Method for Measuring Right-Angle Tearing Strength]

After the film is shrunk by 10% in the longitudinal direction in hot water adjusted at 90° C., it is sampled as a specimen with a predetermined size in accordance with JIS-K-7128. Thereafter, both ends of the specimen were held by a universal tensile testing machine, and a tensile test was carried out under a condition of 200 mm/minute in tensile speed, and the maximum load was measured at the time when the film was completely torn in the longitudinal direction. The maximum load was divided by the thickness of the film to calculate the right-angle tearing strength per unit thickness.

If the right-angle tearing strength after 10% shrinkage in the longitudinal direction in hot water at 90° C. is less than 100 N/mm, the film may be possibly torn easily by impact such as dropping during transportation in the case where the film is used as a label, and therefore it is not preferable, and contrarily, if the right-angle tearing strength exceeds 300 N/mm, the cutting property (easiness of tearing) in an initial stage at the time of tearing a label is not good, and therefore it is not so preferable. The lower limit of the right-angle tearing strength is preferably 125 N/mm, more preferably 150 N/mm or more, and particularly preferably 175 N/mm. On the other hand, the upper limit of the right-angle tearing strength is preferably 275 N/mm, more preferably 250 N/mm, and particularly preferably 225 N/mm.

The heat-shrinkable polyester-based film of the present invention is not particularly limited in its production method, but the film can be obtained, for example, by melt-extruding the above-mentioned polyester raw materials with an extruder to form an unstretched film, and biaxially stretching the unstretched film with a method as follows.

At the time of melt-extrusion of the raw material resin, it is preferable to dry the polyester raw materials by using a drier such as a hopper dryer or a paddle drier, or a vacuum drier. After the polyester raw materials are dried in such a manner, the dried materials are molten at a temperature of 200 to 300° C. by using an extruder, and extruded into a film form. In such extrusion, an arbitrary conventional method such as a T-die method or a tubular method can be adopted.

Then, the sheet-like molten resin after extrusion is quenched so that an unstretched film can be obtained. As a method for quenching the molten resin, a method in which a molten resin is cast on a rotary drum from a spinneret and solidified by quenching to obtain a substantially unoriented resin sheet can be suitably adopted.

Further, the obtained unstretched film is stretched in the width direction under a prescribed condition as described below, and thereafter stretched in the longitudinal direction under a prescribed condition so that the heat-shrinkable polyester-based film of the present invention can be obtained. Hereinafter, preferable biaxial stretching for obtaining the heat-shrinkable polyester-based film of the present invention will be described in detail while taking into consideration the difference from a conventional method for stretching a heat-shrinkable polyester-based film.

[Preferable Method for Stretching Heat-Shrinkable Polyester-Based Film]

An ordinary heat-shrinkable polyester-based film is produced by stretching an unstretched film in a direction to be shrunk. Conventionally, a demand for a heat-shrinkable polyester-based film shrinkable in the longitudinal direction is high, but it is not preferable in terms of productivity to merely stretch an unstretched film in the longitudinal direction since a film having a wide width cannot be produced.

As described above, Patent Document 2 discloses a film shrinkable in the longitudinal direction, but since the film is unstretched in the width direction, the mechanical strength in the width direction is lower and the right-angle tearing strength in the width direction is high, and therefore the film is considered to be unsatisfactory for the presently required quality as a label. Further, the thickness unevenness in the longitudinal direction was significant.

Patent Document 1 discloses a method for stretching an unstretched film in the order of transverse stretching, heat treatment and vertical stretching under prescribed conditions in order to improve the mechanical properties in the longitudinal direction and the width direction. However, in this method, 10 mol % or more of an amorous monomer is contained in PET raw materials as a diol or a dicarboxylic acid, and addition of recycled raw materials is limited. Further, if stretching at a high stretch ratio as disclosed in Patent Document 1 is carried out in the longitudinal direction, the shrinkage rate in the longitudinal direction is lowered and the shrinkage rate in the width direction increases in the case of the film of the present invention obtained by using PET raw materials which do not contain an amorphous component in a large amount, and therefore it is not preferable.

[Stretch Ratio in Width Direction]

The inventors of the present invention have made investigations and consequently found that a film obtained by using intentionally no amorphous PET raw materials has a high shrinkage rate in the stretching direction at a stretch ratio of around two times. It is also found that the shrinkage rate in the stretching direction is lowered and the shrinkage rate in the unstretching direction becomes high if the shrinkage rate is increased more than three times. As a result of the investigations, it is preferable that the film is first transversely stretched at a temperature of Tg+5° C. or higher and Tg+40° C. or lower at 3.5 times or more and 6 times or lower in order to biaxially stretch the film to cause shrinkage in the longitudinal direction. If the stretch ratio is less than 3.5 times, it is insufficient to lower the shrinkage rate in the width direction. The upper limit of the transverse stretch ratio is not particularly limited, but if it is more than 6 times, stretching in the longitudinal direction is difficult to be carried out (so-called breakage tends to occur), and therefore it is not preferable. The stretch ratio is more preferably 3.7 times or more and 5.8 times or less, and furthermore preferably 3.9 times or more and 5.6 times or less.

Since the stretch ratio and shrinkage rate of the film obtained by using PET raw materials which do not contain an amorphous component in a large amount has the above-described relation, the heat treatment after stretching in the width direction and before stretching in the longitudinal direction as described in Patent Document 1 may or may not be carried out.

[Stretch Ratio in Longitudinal Direction]

The stretch ratio in the longitudinal direction is preferably 1.5 times or more and 2.5 times or less at a temperature of Tg+5° C. or higher and Tg+40° C. or lower. If it is 1.5 times or less, the shrinkage rate is insufficient and if it is 2.5 times or more, the shrinkage rate in the width direction becomes high, and therefore it is not preferable as a film uniaxially shrinkable in the longitudinal direction. The stretch ratio is more preferably 1.6 times or more and 2.4 times or less, and further preferably 1.8 times or more and 2.3 times or less.

If the stretching temperature in the longitudinal direction is lower than Tg+5° C., breakage tends to occur at the time of stretching, and therefore it is not preferable. If the stretching temperature is higher than Tg+40° C., heat crystallization of the film is promoted and the shrinkage rate is lowered, and therefore it is not preferable. The temperature is more preferably Tg+8° C. or higher and Tg+37° C. or lower, and furthermore preferably Tg+11° C. or higher and Tg+34° C. or lower.

[Heat Treatment and Relaxation in Width Direction]

It is preferable to carry out relaxation by 0% or more and 15% or less in the width direction while subjecting the film to heat treatment at a temperature of Tg or higher and Tg+30° C. or lower in the state of holding both ends of the film with clips. If the heat treatment temperature is lower than Tg, the heat treatment becomes meaningless and shrinkage over time at the time of storage after production (so-called natural shrinkage rate) becomes high, and therefore it is not preferable. If the heat treatment temperature is higher than Tg+30° C., heat crystallization of molecular chains is promoted and the shrinkage rate is lowered not only in the longitudinal direction but also in the width direction, and therefore it is not so preferable. The temperature is more preferably Tg+3° C. or higher and Tg+27° C. or lower, and furthermore preferably Tg+6° C. or higher and Tg+24° C. or lower.

If the relaxation ratio in the width direction is less than 0%, stretching in the width direction is substantially caused, and it is not preferable as relaxation. The relaxation ratio may be more than 15%, but if the relaxation ratio is high, the width of the film as a product is finally narrowed, and therefore it is not preferable. The relaxation ratio is more preferably 1% or more and 14% or less, and furthermore preferably 2% or more and 13% or less.

As described above, a preferable stretching method in the present invention includes, for example, controlling the stretch ratio in the longitudinal direction to be lower than the stretch ratio in the width direction. Regarding the orientation of molecular chains of the film after stretching, it is considered that the orientation in the longitudinal direction is lower than that in the width direction. When the above consideration is expressed by the refractive index of the film after stretching, the refractive index in the width direction becomes higher than the refractive index in the longitudinal direction.

In a conventional heat-shrinkable polyester-based film containing an amorphous component in a large amount, the direction in which the refractive index is high by employing a high stretch ratio in the longitudinal direction and in the width direction often becomes the main shrinkage direction, but in the case of the film of the present invention, reverse behavior can be observed. In the present invention, the properties of crystalline PET which does not contain a monomer component that can be an amorphous component in a large amount is considered to be involved in the above reverse behavior. That is, it is considered that if crystalline PET is stretched at a high stretch ratio of 3.5 times or more in the width direction, molecular chains are oriented and at the same time crystallization of the molecular chains is promoted, and consequently this is supposed to be a factor functioning to lower the heat shrinkage in the width direction. In this point, the stretch ratio of about 2.5 times or less in the longitudinal direction is in a range where crystallization is not much promoted even if molecular chains are oriented in the longitudinal direction to a certain extent, and therefore it is supposed that a relatively high heat shrinkage rate can be achieved. In the present invention, it is difficult to simply express the relation between the orientation of the molecular chains and the degree of crystallization of the molecular chains, and therefore the relation is expressed as a substitute measure of molecular chain structure in accordance with the heat shrinkage rate, the refractive index, and their magnitude relation in the longitudinal direction and in the width direction. Naturally, it is considered that the relaxation heat treatment in the width direction also contributes to a certain degree of lowering heat shrinkage rate in the width direction.

The thickness unevenness is very worsened if an unstretched film is stretched at 2.5 times or less, and therefore, an unstretched film obtained by using PET raw materials has hardly stretched at a ratio of around two times so far. However, it is found that if a film, which is once stretched at a high stretch ratio of 3.5 times or more in the width direction, is stretched at around two times in the longitudinal direction, the thickness unevenness in the longitudinal direction is improved. This is considered to be because the stretch stress and the stress-strain curve are changed at the time of stretching an unstretched film at around two times in the longitudinal direction by once stretching the unstretched film at a high stretch ratio in the width direction, different from the case of uniaxially stretching an unstretched film at a low stretch ratio.

TABLE 1

| | raw material composition of polyester (mol %) | | | | | |
|---|---|---|---|---|---|---|
| | dicarboxylic acid component | | polyhydric alcohol component | | lubricant addition amount | IV |
| | DMT | IPA | EG | NPG | (ppm) | (dL/g) |
| polyester1 | 100 | 0 | 100 | 0 | 0 | 0.75 |
| polyester2 | 100 | 0 | 100 | 0 | 8000 | 0.75 |
| polyester3 | 95 | 2 | 100 | 0 | 0 | 0.63 |
| polyester4 | 100 | 0 | 70 | 30 | 0 | 0.75 |

DMT: dimethyl terephthalate
IPA: isophthalic acid
EG: ethylene glycol
NPG: neopentyl glycol

TABLE 2

| | composition of resin (weight ratio) | content rate of amorphous raw material (mol %) | glass transition point of raw material (° C.) | transverse stretching stretching condition | | vertical stretching process | | relaxation heat treatment | |
|---|---|---|---|---|---|---|---|---|---|
| | | | | temperature (° C.) | stretching ratio | temperature (° C.) | stretching ratio | temperature (° C.) | relaxation ratio (%) |
| Example 1 | polyester1:polyester2 = 93:7 | 0 | 75 | 90 | 4.5 | 90 | 2 | 90 | 5 |
| Example 2 | polyester2:polyester3 = 7:93 | 1.9 | 75 | 90 | 4.5 | 90 | 2 | 90 | 5 |
| Example 3 | polyester2:polyester3 = 7:93 | 1.9 | 75 | 90 | 4.5 | 90 | 1.5 | 80 | 0 |
| Example 4 | polyester2:polyester3 = 7:93 | 1.9 | 75 | 90 | 4.5 | 90 | 2.5 | 90 | 8 |
| Example 5 | polyester2:polyester3 = 7:93 | 1.9 | 75 | 90 | 4.5 | 90 | 2 | 100 | 5 |
| Example 6 | polyester1:polyester2 = 93:7 | 0 | 75 | 90 | 3.6 | 90 | 2.5 | 90 | 5 |
| Example 7 | polyester1:polyester2:polyester4 = 77:7:16 | 4.8 | 75 | 90 | 4.5 | 90 | 2 | 90 | 5 |
| Comparative Example 1 | polyester1:polyester2 = 93:7 | 0 | 75 | no transverse stretching | | 90 | 2 | 90 | 0 |
| Comparative Example 2 | polyester1:polyester2 = 93:7 | 0 | 75 | 90 | 4.5 | 90 | 3.5 | 90 | 5 |
| Comparative Example 3 | polyester1:polyester2:polyester4 = 43:7:50 | 15 | 75 | 90 | 4.5 | 90 | 2 | 90 | 5 |
| Comparative Example 4 | polyester1:polyester2 = 93:7 | 0 | 75 | 90 | 2 | 90 | 2 | 90 | 5 |

EXAMPLES

Hereinafter, the present invention will be described in more detail by Examples, but the present invention is not limited to aspects of Examples, and it can be suitably modified in the range not departing from the scope of the present invention. The properties and compositions of the raw materials used in Examples and Comparative Examples and the production conditions (stretching, heat treatment conditions, etc.) for the films of Examples and Comparative Examples are shown in Table 1 and Table 2, respectively.

Evaluation methods for films are as follows.

[Tg (Glass Transition Point)]

Using a differential scanning calorimeter manufactured by Seiko Instruments Inc. (model: DSC220), 5 mg of an unstretched film was heated at a temperature rising speed of 10° C./minute from −40° C. to 120° C., Tg was obtained from the thus obtained endothermic curve. Tangent lines were drawn in front of and behind the inflection point of the endothermic curve, and the intersection was defined as Tg (glass transition point).

[Intrinsic Viscosity (IV)]

A polyester in an amount of 0.2 g was dissolved in 50 mL of a solvent mixture of phenol/1,1,2,2-tetrachloroethane (60/40 (weight ratio)), and the intrinsic viscosity was measured at 30° C. using an Ostwald viscometer. The unit is dL/g.

[Heat Shrinkage Rate (Hot Water Heat Shrinkage Rate)]

A film was cut into a 10 cm×10 cm square, treated and heat-shrunk in no load state for 10 seconds in hot water at a predetermined temperature ±0.5° C., and then the dimensions of the film in the vertical and transverse directions were measured, and heat shrinkage rate each was obtained accord ing to the above-mentioned Equation 1. The direction in which the heat shrinkage rate was high was defined as the main shrinkage direction.

[Refractive Index in Longitudinal Direction and in Width Direction]

Using "Abbe refractometer 4T type" manufactured by Atago Co., Ltd., the measurement was carried out after each sample film was left in an atmosphere of 23° C. and 65% RH for 2 hours or longer.

[Tensile Breaking Strength]

A strip-shaped specimen with 140 mm length in the measurement direction (film width direction) and 20 mm length in the direction orthogonal to the measurement direction (film longitudinal direction) was produced. Using a universal tensile testing machine "DSS-100" (manufactured by Shimadzu Corporation), a tensile test was carried out for each specimen under conditions of an atmosphere temperature of 23° C. and a tensile speed of 200 mm/minute while holding 20 mm each in both ends of the specimen with chucks (chuck interval 100 mm), and strength (stress) at tensile break was defined as tensile breaking strength.

[Right-Angle Tearing Strength]

After the film is shrunk by 10% in the main shrinkage direction in hot water adjusted at 90° C., a specimen was produced by sampling into the shape as shown in FIG. 1 in accordance with JIS K 7128 (in the sampling, the longitudinal direction of the specimen was defined as the main shrinkage direction). Thereafter, both ends of the specimen were held by a universal tensile testing machine (manufactured by Shimadzu Corporation, Autograph), and a tensile test was carried out for each specimen under a condition of a tensile speed of 200 mm/minute, and the maximum load was measured at the time when the film was completely torn in the longitudinal direction. The maximum load was divided by the thickness of the film to calculate the right-angle tearing strength per unit thickness.

[Thickness Unevenness in Longitudinal Direction]

The film was subjected to a sampling into a long roll in a size of length 30 mm×width 40 mm, and the thickness was continuously measured along the longitudinal direction of the sample film at a speed of 5 (m/minute) using a thickness meter of a continuously contacting type manufactured by Mikuron. In the sampling of a roll-shaped film specimen, the longitudinal direction of the film specimen was defined as the main shrinkage direction. The thickness unevenness of each film in the longitudinal direction was calculated from the following Equation 2 where Tmax. is the maximum thickness and Tmin. is the minimum thickness upon the measurement while Tave. is an average thickness.

$$\text{Thickness unevenness} = \{(T\text{max.} - T\text{min.})/T\text{ave.}\} \times 100 \, (\%)$$ Equation 2

[Shrinkage Finishing Property (Fitting on Cylindrical-Shaped Body)]

On a heat-shrinkable film, a three color-printing with green, gold and white ink of Toyo Ink Mfg Co., Ltd. was provided previously. By bonding both end parts of the printed film with fusion sealing, a cylindrical-shaped label (a cylindrical label in which the main shrinkage direction of the heat-shrinkable film is the circumferential direction and the outer circumferential length is 1.05 times the outer circumferential length of a bottle on which the label is attached). Thereafter, the cylindrical-shaped label was put on a PET bottle of 500 mL (trunk diameter: 62 mm, minimum diameter of neck part: 25 mm) and subjected to heat shrinkage at a zone temperature of 80° C. with a passing time of 2.5 seconds using a steam tunnel (model: SH-1500-L) manufactured by Fuji Astec Inc. to attach the label on the bottle. In attachment, the neck part was adjusted such that the part of diameter 55 mm was placed on one end of the label. Finishing properties after shrinkage were visually evaluated, and the criteria were as follows.

⊙: No wrinkles, blisters, and shrinkage shortage occur and no color unevenness is observed ◯: No wrinkles, blisters, and shrinkage shortage can be confirmed, but color unevenness is slightly observed Δ: No blisters and shrinkage shortage occur, but unevenness is observed in the neck portion x: Wrinkles, blisters, and shrinkage shortage occur

[Shrinkage Finishing Property (Wrap Round)]

On a heat-shrinkable film, a three color-printing with green, gold and white ink of Toyo Ink Mfg Co., Ltd. was provided, and the printed heat-shrinkable film was cut in a size of length 230 mm×width 100 mm such that the length can be the longitudinal direction. In a state where an aluminum bottle type can of 265 mL (aluminum can having a trunk diameter of 68 mm, a minimum diameter of neck part of 25 mm, and provided with constriction such that the center of the trunk has a diameter of 60 mm) is allowed to stand, the cut film was wound in such a manner that one long side of the film was along with the bottom part of the can. An active energy ray (UV)-curable adhesive produced by the following method was applied, in a sparse manner, to 3 points: that is, upper, lower and center parts of one end in the short side of the film which was brought into contact with the bottle type can so as to fix the film on the bottle type can. Then, the same active energy ray-curable adhesive was applied to the other end of the wound film, and the other end was overlapped by 5 mm width with the one end fixed previously on the bottle type, and the adhesive layer applied to the other end was sandwiched between the both ends. Thereafter, the adhesive part (part where the ends of the film were overlapped with each other) was irradiated immediately with ultraviolet rays at 100 mJ/cm$^2$ by a 3 kW (120 W/cm) air-cooled mercury lamp with one lamp to cure the adhesive and bond the both ends of the film, and thus a bottle type can bearing a heat-shrinkable label was produced. Subsequently, the bottle type can bearing a heat-shrinkable label was immediately sent to a shrinkage tunnel of a steam furnace with a length of 3 m and kept at 92° C., and allowed to pass through the tunnel for 10 seconds, to thereby shrink the label and closely attach the label on the outer circumference of the bottle type can. In attachment of the film, the neck part was adjusted such that the part of diameter 50 mm was placed on one end of the label. Thereafter, finishing properties after shrinkage were visually evaluated with following four-grade standard.

⊙: No wrinkles, blisters, and shrinkage shortage occur and no color unevenness is observed ◯: No wrinkles, blisters, and shrinkage shortage can be confirmed, but color unevenness is slightly observed Δ: No blisters and shrinkage shortage occur, but unevenness is observed in the neck portion x: Wrinkles, blisters, and shrinkage shortage occur <Method for Producing Active Energy Ray (UV)-Curable Adhesive>

A reactor equipped with a thermometer, a stirrer, a distillation tower, a condenser, and a vacuum device was charged with 440 parts of dimethyl terephthalate, 440 parts of dimethyl isophthalate, 412 parts of ethylene glycol, 393 parts of hexane diol, and 0.5 parts of tetrabutoxy titanate, and the materials were heated at 150 to 230° C. for 120 minutes to carry out transesterification. Then, the reaction system was vacuumed to 10 mmHg and heated to 250° C. over 30 minutes to carry out the reaction so that a polyester polyol copolymer was obtained. The polyester polyol had a molecular weight of 1600. Next, a reactor equipped with a thermometer, a stirrer, and a reflux condenser was charged with 100 parts of the polyester polyol copolymer and 120 parts of phenoxyethyl acrylate, and after their dissolution, the reactor was further charged with 15 parts of isophorone diisocyanate and 0.05 parts of dibutyltin dilaurate, and reaction was carried out at 70 to 80° C. for 2 hours, and thereafter, 5 parts of 2-hydroxyethyl acrylate was added and reaction was carried out at 70 to 80° C. to obtain a phenoxyethyl acrylate solution containing a urethane acrylate resin. Immediately before use, 3 parts by mass of 2-hydroxy-2-methyl-1-phenylpropan-1-one (DAROCURE (registered trade mark) 1173: produced by Ciba Specialty Chemicals) was added as a photopolymerization initiator to 100 parts of the solution to obtain an active energy ray (UV)-curable adhesive. The urethane acrylate had a molecular weight of 2000. The composition of the adhesive was collectively shown in Table 3. The above-mentioned molecular weight is number average molecular weight (in terms of polystyrene) and measured by GPC 150c (manufactured by Waters) using tetrahydrofuran as an eluent. At the time of the measurement, column temperature was set to 35° C. and the flow rate was set to 1 mL/minute.

[Perforation Opening Property]

A label in which perforation was previously formed in the width direction orthogonal to the main shrinkage direction of a film was attached on a PET bottle under the same condition for the above measurement condition for shrinkage finishing property (fitting on cylindrical-shaped body) with a proviso that, the perforation was formed by applying the pores of 1 mm length with 1 mm intervals and two perforation lines were formed in the vertical direction (height direction) of the label with width 22 mm and length 120 mm. Thereafter, 500 mL of water was charged in this bottle and cooled at 5° C., the perforation of the label of the bottle immediately after being taken out from the refrigerator was torn by fingers. The number of the bottle in which the label was torn well along the perforation in the vertical direction so that the label could be removed from the bottle was counted, and the ratio (%) of the number to 50 samples in total was calculated. The defect ratio of 20% or less was regarded as acceptable.

Polyesters used in Examples and Comparative Examples were as follows.

Polyester 1: Polyethylene terephthalate (IV 0.75 dL/g)

Polyester 2: Polyethylene terephthalate (IV 0.75 dL/g) obtained by adding 8000 ppm of $SiO_2$ (Sylysia 266, produced by Fuji Silysia Chemical Ltd.) as a lubricant to the polyester in the case of production of the polyester 1

Polyester 3: Recycled raw material "Clear pellet", produced by Yono PET Bottle Recycle Co., Ltd. (IV 0.63 dL/g, this polyester 3 contains 2 mol % of isophthalic acid in the whole dicarboxylic acid components constituting the polyester as shown in Table 1)

Polyester 4: An amorphous polyethylene terephthalate-based polyester copolymer (IV 0.75 dL/g) obtained by randomly copolymerizing 30 mol % of neopentyl glycol in the whole glycol components and using an ethylene terephthalate unit as a main constituent unit Example 1

Polyester 1 and Polyester 2 as described above were mixed in the weight ratio of 93:7 and charged into an extruder. Thereafter, the mixed resin was molten at 280° C., extruded from a T die, and quenched by winding the molten resin around a rotating metal roll the surface of which was cooled to a temperature of 30° C. An unstretched film with a thickness of 171 μm was obtained. The take-off speed (rotational speed of the metal roll) of the unstretched film at this time was about 20 m/minute. The Tg of the unstretched film was 75° C. Thereafter, the unstretched film was introduced into a transversely stretching apparatus (hereinafter, referred to as tenter).

The unstretched film introduced into the tenter was preheated till the film temperature reached 100° C. (Tg+25° C.), and then stretched by 4.5 times in the transverse direction at 90° C. (Tg+15° C.), and subjected to heat treatment at 70° C. (the heat treatment at 70° C. may or may not be carried out since the heat treatment affects very slightly on the physical properties of a final product).

The transversely stretched and heat-treated film was introduced into a vertically stretching machine in which a plurality of rolls were sequentially installed, preheated on a preheating roll till the film temperature reached 90° C. (Tg+15° C.), and thereafter stretched by two times using the difference in rotation speeds of the rolls. Thereafter, the vertically stretched film was forcibly cooled by cooling rolls set at a surface temperature of 25° C.

Thereafter, the cooled film was introduced into a tenter (second tenter), and relaxed by 5% in the width direction while being subjected to heat treatment in an atmosphere of 90° C. (Tg+15° C.) for 8.0 seconds in the second tenter. After the treatment in the second tenter, both end parts were cut and removed to continuously form a biaxially stretched film with about 20 μm for a prescribed length, and thus a film roll of a heat-shrinkable polyester-based film was obtained. The properties of the obtained film were evaluated with the above-mentioned methods. The evaluation results are shown in Table 3.

The obtained film had refractive index higher in the width than in the longitudinal direction and was excellent in shrinkage finishing property, perforation opening property, and the like.

Example 2

A heat-shrinkable film was continuously produced in the same manner as in Example 1, except that Polyester 3 and Polyester 2 were mixed in the weight ratio of 93:7 and charged into an extruder. The properties of the obtained film were evaluated in the same manner as in Example 1. The evaluation results are shown in Table 3.

The obtained film was equivalent to the film of Example 1, and was excellent in shrinkage finishing property, perforation opening property, and the like.

Example 3

Polyester 3 and Polyester 2 were mixed in the weight ratio of 93:7 to obtain a 135 μm-thick unstretched film. A heat-shrinkable film was continuously produced in the same manner as in Example 1, except that the vertical stretch ratio was changed to 1.5 times, and the temperature and the relaxation ratio were changed to 80° C. and 0%, respectively, in the second tenter. The properties of the obtained film were evaluated in the same manner as in Example 1. The evaluation results are shown in Table 3.

The obtained film was equivalent to the film of Example 1 although the shrinkage rate in the longitudinal direction was slightly decreased, and was excellent in shrinkage finishing property, perforation opening property, and the like.

Example 4

Polyester 3 and Polyester 2 were mixed in the weight ratio of 93:7 to obtain a 208 μm-thick unstretched film. A heat-shrinkable film was continuously produced in the same manner as in Example 1, except that the vertical stretch ratio was changed to 2.5 times, and the relaxation ratio was changed to 8% in the second tenter. The properties of the obtained film were evaluated in the same manner as in Example 1. The evaluation results are shown in Table 3.

The obtained film was equivalent to the film of Example 1 although the shrinkage rate in the longitudinal direction was slightly decreased, and was excellent in shrinkage finishing property, perforation opening property, and the like.

Example 5

Polyester 3 and Polyester 2 were mixed in the weight ratio of 93:7 to obtain a 171 μm-thick unstretched film. A heat-shrinkable film was continuously produced in the same manner as in Example 1, except that the temperature was changed to 100° C. in the second tenter. The properties of the obtained film were evaluated in the same manner as in Example 1. The evaluation results are shown in Table 3.

The obtained film was equivalent to the film of Example 1 although the shrinkage rate in the longitudinal direction was slightly decreased, and was excellent in shrinkage finishing property, perforation opening property, and the like.

Example 6

A heat-shrinkable film was continuously produced in the same manner as in Example 1, except that the transverse stretch ratio was changed from 4.5 times to 3.6 times and the stretch ratio in the vertical direction was changed from two times to 2.5 times. The evaluation results are shown in Table 3. As compared with the properties of the film in Example 1, the shrinkage rate in the longitudinal direction was slightly decreased and the shrinkage rate in the width direction was increased, and the right-angle tearing strength in the width direction and the defect ratio in perforation opening property were also increased, but the film was practically usable without any problem.

Example 7

A heat-shrinkable film was continuously produced in the same manner as in Example 1, except that Polyester 1, Polyester 2, and Polyester 4 were mixed in the weight ratio of 77:7:16 and charged into an extruder. The properties of the obtained film were evaluated in the same manner as in Example 1. The evaluation results are shown in Table 3.

The obtained film was equivalent to the film of Example 1, and was excellent in shrinkage finishing property, perforation opening property, and the like.

Comparative Example 1

Polyester 1 and Polyester 2 were mixed in the weight ratio of 93:7 to obtain a 80 μm-thick unstretched film. The film was not transversely stretched but stretched by two times in the longitudinal direction in the same manner as in Example 1. Thereafter, the film was introduced into the second tenter and subjected to heat treatment at a temperature of 90° C. and a relaxation ratio of 0% for 8 seconds while both ends of the film were held by clips to continuously produce a heat-shrinkable film. The properties of the obtained film were evaluated in the same manner as in Example 1. The evaluation results are shown in Table 3.

The film was heat-shrinkable only in the longitudinal direction, and has low refractive index in the width direction, low breaking strength in the width direction, and was inferior in perforation opening property as compared with that of the film of Example 1. Further, the thickness unevenness in the longitudinal direction was also inferior.

Comparative Example 2

Polyester 1 and Polyester 2 were mixed in the weight ratio of 93:7 to obtain a 300 μm-thick unstretched film. A heat-shrinkable film was continuously produced in the same manner as in Example 1, except that the vertical stretch ratio was changed to 3.5 times. The properties of the obtained film were evaluated in the same manner as in Example 1. The evaluation results are shown in Table 3.

The film had high shrinkage rate in the width direction and refractive index higher in the longitudinal direction. The film was inferior in shrinkage finishing property.

Comparative Example 3

A heat-shrinkable film was continuously produced in the same manner as in Example 1, except that Polyester 1, Polyester 2, and Polyester 4 were mixed in the weight ratio of 43:7:50 and charged into an extruder. The properties of the obtained film were evaluated in the same manner as in Example 1. The evaluation results are shown in Table 3.

The film had high shrinkage rate in the width direction and the film was inferior in shrinkage finishing property.

Comparative Example 4

A 76 μm-thick unstretched film was obtained from the same raw materials as those of Example 1. A heat-shrinkable film was continuously produced in the same manner as in Example 1, except that the stretch ratio in the width direction of the unstretched film in the tenter was changed from 4.5 times to two times. The properties of the obtained film were evaluated in the same manner as in Example 1. The evaluation results are shown in Table 3.

The obtained film had refractive index high in the width and bad thick unevenness in the longitudinal direction and was inferior in shrinkage finishing property.

TABLE 3

| | | refractive index | | hot water heat shrinkage rate (%) 90° C. | | tensile breaking strength | right-angle tearing strength | thickness unevenness (%) | shrinkage finishing property fitting on | shrinkage finishing | defect ratio of |
|---|---|---|---|---|---|---|---|---|---|---|---|
| | thickness (μm) | longitudinal direction | width direction | longitudinal direction | width direction | (MPa) width direction | (N/mm) width direction | longitudinal direction | cylindrical-shaped body | property wrap round | perforation opening (%) |
| Example 1 | 20 | 1.595 | 1.635 | 40 | 5 | 180 | 220 | 8 | ◎ | ◎ | 10 |
| Example 2 | 20 | 1.595 | 1.635 | 40 | 5 | 180 | 220 | 8 | ◎ | ◎ | 10 |
| Example 3 | 20 | 1.583 | 1.644 | 33 | 5 | 190 | 200 | 6 | ○ | ◎ | 14 |

TABLE 3-continued

<table>
<tr><th rowspan="3"></th><th rowspan="3">thickness (μm)</th><th colspan="2">refractive index</th><th colspan="2">hot water heat shrinkage rate (%) 90° C.</th><th>tensile breaking strength</th><th>right-angle tearing strength</th><th>thickness unevenness (%)</th><th>shrinkage finishing property fitting on</th><th>shrinkage finishing</th><th>defect ratio of</th></tr>
<tr><th colspan="11">evaluation result</th></tr>
<tr><th>longitudinal direction</th><th>width direction</th><th>longitudinal direction</th><th>width direction</th><th>(MPa) width direction</th><th>(N/mm) width direction</th><th>longitudinal direction</th><th>cylindrical-shaped body</th><th>property wrap round</th><th>perforation opening (%)</th></tr>
<tr><td>Example 4</td><td>20</td><td>1.603</td><td>1.628</td><td>35</td><td>6</td><td>170</td><td>240</td><td>10</td><td>○</td><td>◎</td><td>8</td></tr>
<tr><td>Example 5</td><td>20</td><td>1.599</td><td>1.638</td><td>32</td><td>1</td><td>180</td><td>210</td><td>8</td><td>○</td><td>◎</td><td>12</td></tr>
<tr><td>Example 6</td><td>20</td><td>1.605</td><td>1.610</td><td>32</td><td>10</td><td>105</td><td>260</td><td>10</td><td>○</td><td>○</td><td>18</td></tr>
<tr><td>Example 7</td><td>20</td><td>1.588</td><td>1.625</td><td>45</td><td>8</td><td>170</td><td>250</td><td>10</td><td>◎</td><td>◎</td><td>18</td></tr>
<tr><td>Comparative Example 1</td><td>20</td><td>1.601</td><td>1.558</td><td>44</td><td>−2</td><td>40</td><td>460</td><td>25</td><td>◎</td><td>◎</td><td>46</td></tr>
<tr><td>Comparative Example 2</td><td>20</td><td>1.621</td><td>1.601</td><td>15</td><td>15</td><td>150</td><td>260</td><td>9</td><td>X</td><td>X</td><td>10</td></tr>
<tr><td>Comparative Example 3</td><td>20</td><td>1.575</td><td>1.610</td><td>50</td><td>50</td><td>130</td><td>280</td><td>12</td><td>X</td><td>X</td><td>18</td></tr>
<tr><td>Comparative Example 4</td><td>20</td><td>1.581</td><td>1.578</td><td>37</td><td>33</td><td>100</td><td>340</td><td>18</td><td>X</td><td>X</td><td>32</td></tr>
</table>

INDUSTRIAL APPLICABILITY

The heat-shrinkable polyester-based film of the present invention has excellent properties as described above, and therefore can be used preferably for an application of a label for a bottle or the like, and wrapped bodies such as bottles obtained by using the film as a label have beautiful appearance. The film has sufficient heat shrinkage rate in the longitudinal direction even if it contains none or an extremely low content of a monomer component that can be an amorphous component in a polyester, and therefore the ratio of recycled raw materials can be increased and thus the film is proper in terms of environmental awareness.

DESCRIPTION OF THE NUMERALS

F film

The invention claimed is:

1. A heat-shrinkable polyester-based film comprising ethylene terephthalate as a main constituent component and containing 0 mol % or more and 5 mol % or less of a monomer component that can be an amorphous component in the whole polyester resin components, and having a main shrinkage direction in the longitudinal direction, wherein the heat-shrinkable polyester-based film satisfies the following requirements (1) to (3):

(1) a hot water heat shrinkage rate in the longitudinal direction is 15% or more and 50% or less when the film is treated in hot water at 90° C. for 10 seconds;
(2) a hot water heat shrinkage rate in the width direction orthogonal to the longitudinal direction is 0% or more and 12% or less when the film is treated in hot water at 90° C. for 10 seconds; and
(3) a refractive index in the longitudinal direction is 1.570 or more, a refractive index in the width direction is 1.570 or more, and the refractive index in the width direction, which is the direction orthogonal to the main shrinkage direction, is higher than the refractive index in the longitudinal direction, which is the main shrinkage direction.

2. The heat-shrinkable polyester-based film according to claim 1, wherein a tensile breaking strength in the width direction, which is the direction orthogonal to the main shrinkage direction, is 80 MPa or more and 200 MPa or less.

3. The heat-shrinkable polyester-based film according to claim 2, wherein the film has a thickness unevenness of 11% or less in the longitudinal direction, which is the main shrinkage direction.

4. The heat-shrinkable polyester-based film according to claim 1, wherein the film has a thickness unevenness of 11% or less in the longitudinal direction, which is the main shrinkage direction.

* * * * *